United States Patent
Chauhan et al.

(10) Patent No.: US 7,048,871 B2
(45) Date of Patent: May 23, 2006

(54) PROCESS FOR PRODUCING A DEICING/ANTI-ICING FLUID

(75) Inventors: Satya P. Chauhan, Columbus, OH (US); William D. Samuels, Richland, WA (US); Sara F. Kuczek, Pataskala, OH (US); H. Nicholas Conkle, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 10/980,361

(22) Filed: Nov. 3, 2004

(65) Prior Publication Data
US 2005/0253110 A1    Nov. 17, 2005

Related U.S. Application Data

(60) Provisional application No. 60/516,921, filed on Nov. 3, 2003.

(51) Int. Cl.
   *C09K 3/18* (2006.01)
(52) U.S. Cl. .......................... 252/70; 106/13
(58) Field of Classification Search ................. 252/70; 106/13
   See application file for complete search history.

(56) References Cited

U.S. PATENT DOCUMENTS

| | | | | |
|---|---|---|---|---|
| 4,448,702 A | | 5/1984 | Kaes | 252/70 |
| 4,746,449 A | | 5/1988 | Peel | 252/70 |
| 5,264,623 A | | 11/1993 | Oehr et al. | 562/515 |
| 5,498,362 A | | 3/1996 | Mathews | 252/70 |
| 5,635,071 A | | 6/1997 | Al-Samadi | 210/652 |
| 5,876,621 A | | 3/1999 | Sapienza | 252/70 |
| 5,980,774 A | | 11/1999 | Sapienza | 252/70 |
| 5,993,684 A | * | 11/1999 | Back et al. | 252/70 |
| 6,129,857 A | | 10/2000 | Sapienza | 252/70 |
| 6,287,480 B1 | | 9/2001 | Berglund et al. | 252/70 |
| 6,315,919 B1 | | 11/2001 | Sapienza | 252/70 |
| 6,340,581 B1 | | 1/2002 | Gaddy | 435/140 |
| 6,416,684 B1 | | 7/2002 | Bloomer | 252/70 |
| 6,468,442 B1 | | 10/2002 | Bytnar | 252/70 |
| 6,506,318 B1 | * | 1/2003 | Sapienza et al. | 252/70 |
| 6,540,934 B1 | | 4/2003 | Sapienza et al. | 252/70 |
| 6,544,434 B1 | * | 4/2003 | Sapienza | 252/70 |
| 6,596,189 B1 | | 7/2003 | Moles et al. | 252/70 |
| 6,599,440 B1 | | 7/2003 | Hartley et al. | 252/70 |
| 6,605,232 B1 | | 8/2003 | Montgomery et al. | 252/70 |
| 6,623,657 B1 | | 9/2003 | Berglund et al. | 252/70 |
| 6,890,451 B1 | | 5/2005 | Sapienza et al. | 252/70 |
| 2002/0063236 A1 | | 5/2002 | Sapienza | 252/70 |
| 2003/0201421 A1 | | 10/2003 | Sapienza | 252/70 |

FOREIGN PATENT DOCUMENTS

| | | |
|---|---|---|
| EP | 0 860 490 A 1 | 8/1998 |
| WO | WO 02/26910 A1 * | 4/2002 |
| WO | WO 2004/039910 A2 | 5/2004 |
| WO | WO 2004/039910 A3 | 5/2004 |

OTHER PUBLICATIONS

Agricultural Publication G01990, Biodiesel Fuel, Oct. 1, 1993.
Zhang et al., "Biodiesel production from waste cooking oil: 1. Process design and technological assessment", Bioresource Technology, vol. 89, pp. 1-16 (2003), no month.

* cited by examiner

*Primary Examiner*—Anthony J. Green
(74) *Attorney, Agent, or Firm*—MacMillan, Sobanski, Todd, LLC

(57) ABSTRACT

In a process for producing a deicing/anti-icing fluid, a byproduct stream is obtained from a process that produces monoalkyl esters of long chain fatty acids. The stream includes water, glycerol, and an alkali-containing compound. The stream is converted to a deicing/anti-icing fluid by adding an acid to the stream to neutralize the alkali-containing compound to produce an alkali salt that functions as a supplemental freezing point depressant.

35 Claims, No Drawings

PROCESS FOR PRODUCING A DEICING/ANTI-ICING FLUID

CROSS-REFERENCE TO RELATED APPLICATION

This application claims the benefit of U.S. provisional application Ser. No. 60/516,921, filed Nov. 3, 2003.

BACKGROUND OF THE INVENTION

This invention relates in general to freezing point depressant compositions and processes, and in particular to a process for producing a deicing/anti-icing fluid from a byproduct stream.

Processes for producing alkyl esters often produce a byproduct stream in addition to the esters. For example, biodiesel fuel (fatty acid alkyl esters) is typically produced by transesterifying a triglyceride with an alcohol to yield the esters and glycerol. The esters are separated, and a byproduct stream from the process contains the glycerol, water, alkali catalyst, alcohol, free fatty acids (FFAs) and other byproducts of the reaction. The byproduct stream can be subjected to additional processing steps to separate and purify the glycerol. The biodiesel process is described in a publication by Zhang et al., "Biodiesel production from waste cooking oil: 1. Process design and technological assessment", Bioresource Technology, vol. 89, pp. 1–16 (2003).

Deicing/anti-icing fluids are used in many applications, such as on roadways, sidewalks, airport runways, aircraft exteriors, and other outdoor surfaces where icing is a problem. Deicing involves the application of a deicing fluid onto ice that has already formed on the surface in order to remove the ice; the deicing fluid lowers the freezing point of the ice so that it becomes a liquid rather than a solid. Anti-icing involves the application of an anti-icing fluid onto a surface before ice is present, thereby lowering the freezing point of any precipitation that contacts the surface and preventing it from turning into ice. The term "deicing/anti-icing fluid" refers to a fluid that functions as a deicing fluid and/or an anti-icing fluid. The deicing/anti-icing fluids usually contain water, a freezing point depressant, and appropriate additives. Some commonly used freezing point depressants include propylene glycol, ethylene glycol, and salts such as potassium acetate, sodium acetate, sodium chloride, calcium chloride and sodium formate.

U.S. Pat. No. 6,540,934 assigned to METSS, issued Apr. 1, 2003, discloses deicing/anti-icing fluids containing a monocarboxylic acid salt such as potassium acetate. The patent states that glycerol can also be added to inhibit corrosion.

U.S. Pat. No. 6,596,189 assigned to General Atomics, issued Jul. 22, 2003, discloses deicing fluids containing a mixture of alkaline earth metal and alkali metal carboxylates (such as acetates) along with an aliphatic alcohol.

U.S. Pat. No. 4,448,702 assigned to Lang & Co., Chemisch-Technische Produkte Kommanditgesellschaft (Vienna, AT), issued May 15, 1984 discloses the use of succinic acid and other dicarboxylic acid salts for deicing.

U.S. Pat. No. 6,287,480 assigned to Michigan State University, issued Sep. 11, 2001 discloses deicing compositions which are suitable and effective for airport applications and which inhibit the corrosive effects of conventional road salt. The subject discloses deicing compositions comprising succinate salts.

U.S. Pat. No. 6,623,657 assigned to Michigan State University, issued Sep. 23, 2003, discloses deicing compositions including either succinic acid or succinic anhydride, and a neutralizing base such as sodium hydroxide, potassium hydroxide or ammonium hydroxide. The deicing compositions when mixed with water produce succinate salts in a reaction that rapidly releases sufficient heat to melt the ice on the surface and the succinate salts act as a deicer and freezing point depressant. The deicing compositions can further include a glycol that inhibits the formation of the ice on the deiced surface.

SUMMARY OF THE INVENTION

The present invention relates to a process for producing a deicing/anti-icing fluid. A byproduct stream is obtained from a process that produces alkyl esters. In a preferred embodiment, a byproduct stream is obtained from a process that produces monoalkyl esters of long chain fatty acids. The stream includes water, glycerol, and an alkali-containing compound. The stream is converted to a deicing/anti-icing fluid by adding an acid to the stream to neutralize the alkali-containing compound to produce an alkali salt that functions as a supplemental freezing point depressant.

In a preferred embodiment, the byproduct stream includes water, glycerol, free fatty acids, and an alkali-containing compound. The stream is converted to a deicing/anti-icing fluid by adding an acid to the stream to neutralize the alkali-containing compound to produce an alkali salt that functions as a supplemental freezing point depressant. The free fatty acids are removed from the fluid.

In another embodiment, the invention relates to a process for producing a deicing solid having reduced corrosiveness. A byproduct stream is obtained from a process that produces alkyl esters, the stream including water, glycerol, and an alkali-containing compound. The stream is converted to a deicing/anti-icing fluid by adding an acid to the stream to neutralize the alkali-containing compound to produce an alkali salt that functions as a supplemental freezing point depressant. The fluid is then applied onto a deicing solid to produce a coated deicing solid having reduced corrosiveness compared to the uncoated deicing solid.

The invention also relates to a deicing/anti-icing fluid comprising water, glycerol, and an alkali salt that functions as both a buffer and a freezing point depressant.

Various advantages of this invention will become apparent to those skilled in the art from the following detailed description of the preferred embodiments.

DETAILED DESCRIPTION OF THE PREFERRED EMBODIMENTS

The process of the invention produces a deicing/anti-icing fluid using a byproduct stream from an alkyl ester process, such as a biodiesel fuel process. The process makes beneficial use of byproducts that would otherwise require further processing or disposal. This is advantageous in relation to biodiesel fuel processing in particular, because when the production of biodiesel fuel increases in the future, it may be difficult to economically dispose of the larger volume of byproducts produced.

Specifically, the process makes use of the glycerol in the byproduct stream as the primary freezing point depressant. Advantageously, the glycerol is nontoxic to the environment. The process also makes use of a material in the byproduct stream that was considered to be a contaminant, by converting the material to a supplemental freezing point depressant. Thus, the invention eliminates the expense of removing the contaminant from the byproduct stream. The invention also eliminates the expense of producing a deicing/anti-icing fluid from scratch by purchasing freezing point depressants and adding them to water along with appropriate additives. In a preferred embodiment, the invention also provides for simple means of removing FFA employing processing steps that also produce a fluid having deicing/anti-icing properties. In view of these advantages, the process achieves the low cost production of a deicing/anti-icing fluid.

Initially, a byproduct stream is obtained from a process that produces alkyl esters. The stream includes at least water, glycerol, and an alkali-containing compound. The stream can be obtained from any suitable alkyl ester process. Some nonlimiting examples of processes that can produce suitable byproduct streams include animal fat rendering, vegetable oil hydrolysis, and soap making.

In a particular embodiment, the byproduct stream is obtained from a process that produces monoalkyl esters of long chain fatty acids, such as a biodiesel process in which the esters are produced by esterifying a triglyceride (e.g., virgin or waste vegetable oil or animal fat). The byproduct stream includes water, glycerol, an alkali-containing compound, and usually an alcohol such as methanol or ethanol. (As used herein, "alcohol" refers to an alcohol other than the glycerol.) In a biodiesel process and some other alkyl ester processes, the alkali-containing compound is a catalyst in the process. The biodiesel byproduct stream also typically includes free fatty acids (FFAs), soaps and salt.

By "alkali-containing compound" is meant any compound that contains an alkali metal or an alkaline earth metal, and that can be converted to a supplemental freezing point depressant as discussed below. Some nonlimiting examples of suitable alkali-containing compounds include alkali metal hydroxides such as sodium hydroxide or potassium hydroxide, alkali metal alkoxides such as sodium methoxide, potassium methoxide, sodium ethoxide, potassium ethoxide, and combinations thereof.

The byproduct stream is converted to a deicing/anti-icing fluid by adding an acid to the stream, the choice of acid depending on the deicing application. When the fluid is used as an aircraft deicing fluid, preferably the acid used has a pKa not less than 3 so that it is not a strong acid such as nitric, sulfuric, hydrochloric or hydrobromic. In a preferred embodiment, the acid used is acetic acid. The acid neutralizes the alkali-containing compound to produce an alkali salt that functions as a supplemental freezing point depressant. The alkali salt works in combination with the glycerol, which is the primary freezing point depressant. By "alkali salt" is meant an alkali metal salt or an alkaline earth metal salt. The neutralization can be conducted in one or more steps. The type of alkali salt produced depends on the types of acid, which in turn depends on the deicing application, and alkali-containing compound used. In some preferred embodiments, the alkali salt is selected from the group consisting of alkali acetates (e.g., alkali metal acetate produced by acetic acid neutralization of alkali metal hydroxide), alkali succinates (e.g., alkali metal succinate produced by succinic acid neutralization of alkali metal hydroxide), alkali phosphates (e.g., alkali metal phosphate produced by phosphoric acid neutralization of alkali metal hydroxide), alkali chlorides, and combinations thereof. Preferably, the deicing/anti-icing fluid does not contain alkali sulfates or alkali nitrates; sulfate and nitrate ions are generally undesirable from corrosion and environmental perspectives.

In a particular embodiment, the stream is neutralized to convert part of the alkali-containing compound to an alkali phosphate (e.g., in an amount within a range of from about 0.05% to about 0.5% by weight of the deicing/anti-icing fluid). The remainder of the alkali-containing compound can be neutralized to any suitable salt, such as an alkali acetate (generally preferred for runway use, or for aircraft use when the quantity of the acetate is limited), an alkali chloride (generally acceptable for roadway use), and/or an alkali succinate (especially in combination with chloride for roadway use). Typically, the fluid contains not more than about 0.5% phosphate to avoid environmental concerns. However, the presence of a small amount of alkali phosphate is preferred because the phosphate functions as a buffer in addition to functioning as a freezing point depressant. One embodiment of the invention is a deicing/anti-icing fluid containing water, glycerol, and an alkali salt that functions as both a buffer and a freezing point depressant.

The alkali salt functions as a freezing point depressant such that it follows the colligative properties. Preferably, for roadway applications, the alkali salt has low corrosion properties such that it is not deleterious to metals, roadways or concrete, as described in SHRP H-205.3/205.7 protocol of the "Handbook of Test Methods for Evaluating Chemical Deicers", SHRP-H/WD-90, Strategic Highway Research Program, National Science Council, Washington, D.C. (1992). For runway deicing/anti-icing, the alkali salt preferably meets the requirements of AMS 1435A specification. Additionally, for aircraft deicing/anti-icing, the requirements for AMS 1424E are preferably met.

The stream containing water, glycerol, alkali salt and other materials can then be used as a deicing/anti-icing fluid. It is sometimes preferred to remove one or more materials from the stream before its use, e.g., materials such as alcohol, water, free fatty acids (FFAs), esters, color materials, and/or odor materials. For example, excess methanol and any excess water can be removed. The methanol can be removed by flashing or any other suitable method. In a preferred embodiment, the byproduct stream includes FFAs, and the FFAs are removed from the deicing/anti-icing fluid. The FFAs in the stream can be removed by any suitable method, or example by using a fat removal process such as: (a) treatment with activated carbon, (b) treatment of the biodiesel byproduct stream with an excess of concentrated acid followed by gravity separation, (c) sequential treatment with acid and alkali to cause saponification, or (d) emulsification by the addition of a suitable emulsifier. In one method, the removal of the free fatty acids is facilitated by adding a material to the fluid to increase its bulk density before removing the free fatty acids by gravity separation, skimming, centrifugation, cyclone separation or another suitable method. The addition of potassium acetate or other materials can increase the bulk density of the fluid.

Any esters in the stream can also be removed. The removal of FFAs and esters helps to maintain a homogeneous fluid during storage as well as to maximize roadway friction if the fluid is applied to a runway or roadway. Color bodies or odorous materials can be removed by carbon adsorption, vacuum distillation, or other techniques. In a preferred embodiment, the use of activated carbon following acid neutralization of the alkali can remove most of the undesirable impurities.

It is also sometimes preferred to add one or more materials to the stream before its use, e.g., materials such as corrosion inhibitors, pH adjusters and/or buffers, preservative/anti-oxidants, wetting agents, and/or additional freezing point depressants. For example, if the salt is an alkali chloride, it may be desirable to add a salt of succinic acid or another corrosion inhibitor. Additional freezing point depressant can be added to further reduce the freezing point of the deicing/anti-icing fluid. The additional freezing point depressant can be the same as that already present in the stream, or it can be a different type of freezing point depressant. For example, an alkali metal or alkaline earth metal carboxylate can be added for runway use, or an alkali metal or alkaline earth metal chloride can be added for roadway use. A pH adjuster and/or a buffer can be added to maintain the pH of the deicing/anti-icing fluid within a preferred range of from about pH 7 to about pH 11.

Some typical and preferred ranges of ingredients of the deicing/anti-icing fluids are shown in the following table:

| Component | Typical Range | | Runway/Roadway Deicing Preferred Range | | Aircraft Deicing Preferred Range | |
|---|---|---|---|---|---|---|
| | Low % | High % | Low % | High % | Low % | High % |
| Glycerol | 15 | 88 | 20 | 85 | 70 | 88 |
| Alkali Salt | 1 | 20 | 5 | 20 | 1 | 3.5 |
| Additional Freezing Point Depressant | 0 | 40 | 5 | 40 | 5 | 15 |
| | | | | | (no salts) | (no salts) |
| Buffer | 0 | 2 | 0.05 | 0.5 | 0.1 | 0.9 |
| Corrosion Inhibitor | 0 | 2 | 0 | 0.1 | 0 | 0.1 |
| Preservative | 0 | 0.1 | 0.001 | 0.01 | 0.001 | 0.01 |
| Water | 10 | 70 | 12 | 50 | 8 | 30 |

The deicing/anti-icing fluids can be used in various applications requiring deicing and/or anti-icing. Common applications would include surfaces of, for example, aircrafts, airport runways, roadways, walkways, sidewalks, bridges, entrances, electrical tower structures and their components, electricity transmission lines, canals, locks, vessels, nautical components, railroad switches, and motor vehicles. In addition, the fluids can be used in applications such as birdbaths, outdoor fountains, decorative ponds, and other outdoor areas where water freezing would be aesthetically or functionally unacceptable. The application will dictate the type and quantity of acid used to neutralize the alkali in the byproduct stream as well as addition of salts. For example, preferably only sodium and/or potassium acetate, in small quantities, is used in aircraft deicers. Similarly, the use of inorganic acids such as hydrochloric acid on the addition of sodium chloride may be avoided for use in runway and aircraft deicers.

In one embodiment, the deicing/anti-icing fluids are used to prewet road salt to make a lower corrosion and lower cost deicer. Typical road salts, or solid freezing point depressants, include sodium chloride and calcium chloride. The fluid can be applied by any suitable method, such as by spraying onto the road salt or mixing with the road salt. If the fluid is used for this application, there is no need to remove any choride impurites from the byproduct stream (commonly found in many biodiesel and other transesterification products of seed oil). Alternatively, the deicing/anti-icing fluid can be mixed with a brine solution for applying as a liquid "on-demand" ready-to-use deicer for bridges and other surfaces.

EXAMPLES

Following are some examples of deicing/anti-icing fluids according to the invention. Several different applications are exemplified.

Aircraft Deicing/Anti-Icing

During the oil (triglyceride) conversion process, for example, biodiesel manufacture, a minimal quantity of alkali catalyst is used and the resulting byproduct stream is neutralized to a pH of about 7 using partly phosphoric acid and partly acetic acid. The resulting mixture is treated in an evaporator to remove excess water and methanol, followed by activated carbon treatment to remove FFA, color bodies, odor, and other undesirable organic impurities, followed by addition of a preservative. This produces an aircraft deicing/anti-icing concentrate meeting the specifications of Type I deicers/anti-icers under AMS 1424E.

| Component | % Range | % Preferred |
|---|---|---|
| Glycerol | 70–90 | 80–85 |
| Sodium or Potassium Acetate | 0.5–5 | 0.5–3.5 |
| Sodium or Potassium Phosphate (also abuffer) | 0.2–2 | 0.2–0.5 |
| Water | 10–20 | 15–20 |
| Preservative | 0–0.1 | 0.001–0.01 |
| Brij ® 30 (wetting agent) | 0–0.1 | 0.01–0.05 |
| Polyvinylpyrrolidone MW 30,000 | 0.01 | 0.01–0.05 |
| Dye | 0.01–0.02 | trace |

If desired, the removal of water using an evaporator can be minimized or eliminated to produce a diluted (ready-to-use) aircraft deicer/anti-icer. The amount of water increases to about 40% and the amount of other species declines accordingly.

Runway Deicing/Anti-Icing

The byproduct streatm from an oil conversion process such as biodiesel manufacture is neutralized with acetic acid, with or without small quantities of phosphoric or succinic acid (a corrosion inhibitor), followed by removal of organic impurities via evaporation and activated carbon treatment, followed by addition of potassium acetate. Preferably, in the neutralization step, an excess of concentrated acetic acid is used to facilitate the removal of FFA via gravity-separation means. The excess acid is subsequently neutralized with potassium hydroxide to obtain the correct quantity of acetate salt(s) to achieve a freezing point of about −60° C. The neutralization converts the residual FFA to soaps, which can be easily removed by gravity since the formation of acetate salts raises the density of aqueous phase relative to the fat/soap phase.

| Component | % Range | % Preferred |
|---|---|---|
| Glycerol | 15–88 | 20–75 |
| Sodium Acetate | 2–10 | 3–5 |
| Potassium Acetate | 0–40 | 5–35 |
| Sodium Phosphate | 0–2 | 0–0.5 |
| Potassium Succinate | 0–2 | 0–1 |
| Water | 10–60 | 12–50 |
| Preservative | 0–0.1 | 0.001–0.01 |
| Dye | 0.01–0.02 | Trace |

The above formulation is also suitable for roadway, pavement, or bridge applications to provide excellent corrosion prevention. The fluid can be used as a brine or to prewet road salt to make a lower-corrosion and low-cost solid deicer.

Roadway/Pavement Deicing/Anti-Icing

The process is similar to the example for runway deicing/anti-icing except that some or all of the acetic acid, including the excess acid can be replaced with hydrochloric acid, and the additional neutralization of acid, if needed, can be done with sodium hydroxide, to produced a lower cost deicer/anti-icer for bridges and roadways. Here the glycerol provides corrosion protection against salt corrosion. The fluid does not need to be treated to remove organic impurities other than some FFA. It also is not necessary to provide freeze protection down to −60° C. as in the case of runway deicers. Finally, the fluid can be used as a brine or for prewetting road salt which has much less corrosion potential that salt alone.

| Component | % Range | % Preferred |
|---|---|---|
| Glycerol | 5–88 | 10–25 |
| Sodium Chloride | 5–22 | 8–20 |
| Sodium or Potassium Succinate | 0–5 | 1–3 |
| Sodium or Potassium Acetate | 0–20 | 2–10 |
| Water | 10–70 | 30–60 |
| Preservative | 0–0.1 | 0.001–0.01 |

In accordance with the provisions of the patent statutes, the principle and mode of operation of this invention have been described in its preferred embodiments. However, it must be understood that this invention may be practiced otherwise than as specifically described without departing from its spirit or scope.

What is claimed is:

1. A process for producing a deicing/anti-icing fluid comprising:
   obtaining a byproduct stream from a process that produces alkyl esters, the stream including water, glycerol, and an alkali-containing compound; and
   converting the stream to a deicing/anti-icing fluid by adding an acid to the stream to neutralize the alkali-containing compound to produce an alkali salt that functions as a supplemental freezing point depressant.

2. A process according to claim 1 wherein the alkali-containing compound is a catalyst in the process that produces the alkyl esters.

3. A process according to claim 1 wherein the alkali-containing compound is selected from the group consisting of alkali metal hydroxides, alkali metal alkoxides, and combinations thereof.

4. A process according to claim 1 wherein the alkali salt is selected from the group consisting of alkali acetates, alkali succinates, alkali phosphates, alkali chlorides, and combinations thereof.

5. A process according to claim 1 wherein the byproduct stream additionally includes a material selected from the group consisting of alcohols, free fatty acids, and combinations thereof, and wherein the process comprises an additional step of removing at least a portion of the material from the stream.

6. A process according to claim 1 comprising an additional step of adding to the stream a material selected from the group consisting of corrosion inhibitors, pH adjusters and/or buffers, emulsifiers, additional freezing point depressants, preservatives, colorants, wetting agents, and combinations thereof.

7. A process according to claim 1 wherein the acid is not a strong acid.

8. A process according to claim 1 wherein the alkali salt additionally includes an alkali acetate, an alkali succinate, an alkali chloride, or a combination thereof.

9. A process according to claim 1 wherein the alkali salt comprises an alkali acetate, and wherein the total amount of the alkali acetate is from 2% to 40% by weight of the fluid.

10. A process according to claim 1 wherein the alkali salt comprises an alkali succinate, and wherein the total amount of the alkali succinate is from 2% to 10% by weight of the fluid.

11. A process according to claim 1 wherein the byproduct stream is obtained from a process that produces monoalkyl esters of long chain fatty acids.

12. A process according to claim 11 wherein the process that produces monoalkyl esters of long chain fatty acids is a process for esterifying a triglyceride.

13. A process according to claim 11 wherein the byproduct stream additionally includes a material selected from the group consisting of alcohols, free fatty acids, and combinations thereof, and wherein the process comprises an additional step of removing at least a portion of the material from the stream.

14. A process according to claim 11 comprising an additional step of adding to the stream a material selected from the group consisting of corrosion inhibitors, pH adjusters and/or buffers, emulsifiers, additional freezing point depressants, preservatives, colorants, wetting agents, and combinations thereof.

15. A process according to claim 11 wherein the alkali salt includes an alkali phosphate in an amount within a range of from about 0.05% to about 1% by weight of the deicing/anti-icing fluid.

16. A process according to claim 11 wherein the alkali salt functions as both a buffer and a freezing point depressant.

17. A process according to claim 11 wherein the fluid does not contain alkali sulfates or alkali nitrates.

18. A process according to claim 11 wherein the alkali salt has low corrosion properties such that it is not deleterious to metals, roadways or concrete.

19. A process for producing a deicing/anti-icing fluid comprising:
   obtaining a byproduct stream from a process that produces alkyl esters, the stream including water, glycerol, free fatty acids, and an alkali-containing compound; and
   converting the stream to a deicing/anti-icing fluid by adding an acid to the stream to neutralize the alkali-containing compound to produce an alkali salt that functions as a supplemental freezing point depressant; and
   removing the free fatty acids from the fluid.

20. A process according to claim 19 wherein the removal of the free fatty acids is facilitated by adding a material to the fluid to increase its bulk density before removing the free fatty acids.

21. A process according to claim 19 wherein the acid is not hydrochloric acid.

22. A process according to claim 19 wherein the acid is not a strong acid.

23. A process according to claim 19 wherein the fluid meets the requirements of AMS 1435A specification for a runway deicing/anti-icing fluid.

24. A process according to claim 19 wherein the fluid meets the requirements of AMS 1424E specification for an aircraft deicing/anti-icing fluid.

25. A process according to claim 19 wherein the byproduct stream further includes esters, and wherein the process further includes a step of removing the esters from the fluid.

26. A process according to claim 19 wherein the byproduct stream further includes color bodies, and wherein the process further includes a step of removing the color bodies from the fluid.

27. A process according to claim 19 wherein the byproduct stream further includes odorous materials, and wherein the process further includes a step of removing the odorous materials from the fluid.

28. A process according to claim 19 wherein the alkali-containing compound is selected from the group consisting of alkali metal hydroxides, alkali metal alkoxides, and combinations thereof.

29. A process according to claim 19 wherein the alkali salt is selected from the group consisting of alkali acetates, alkali succinates, alkali phosphates, alkali chlorides, and combinations thereof.

30. A process according to claim 19 wherein the byproduct stream is obtained from a process that produces monoalkyl esters of long chain fatty acids.

31. A process according to claim 30 wherein the process that produces monoalkyl esters of long chain fatty acids is a process for esterifying a triglyceride.

32. A process according to claim 19 wherein the alkali salt includes an alkali phosphate in an amount within a range of from about 0.05% to about 1% by weight of the deicing/anti-icing fluid.

33. A process according to claim 19 wherein the alkali salt functions as both a buffer and a freezing point depressant.

34. A process for producing a deicing solid having reduced corrosiveness comprising:
- obtaining a byproduct stream from a process that produces alkyl esters, the stream including water, glycerol, and an alkali-containing compound;
- converting the stream to a deicing/anti-icing fluid by adding an acid to the stream to neutralize the alkali-containing compound to produce an alkali salt tat functions as a supplemental freezing point depressant; and
- applying the fluid onto a deicing solid to produce a coated deicing solid having reduced corrosiveness compared to the deicing solid not coated with the fluid.

35. A process according to claim 34 wherein the deicing solid is a road salt.

* * * * *